(12) United States Patent
Kemppainen et al.

(10) Patent No.: US 7,490,772 B2
(45) Date of Patent: Feb. 17, 2009

(54) CODE READER

(75) Inventors: Antti Kemppainen, Oulu (FI); Esko Strömmer, Oulo (FI); Heikki Huomo, Oulu (FI); Raimo Korhonen, Tampere (FI)

(73) Assignee: Nokia Corporation, Helsinki (FI)

( * ) Notice: Subject to any disclaimer, the term of this patent is extended or adjusted under 35 U.S.C. 154(b) by 336 days.

(21) Appl. No.: 11/024,035

(22) Filed: Dec. 29, 2004

(65) Prior Publication Data
US 2006/0138233 A1 Jun. 29, 2006

(51) Int. Cl.
*G06K 9/18* (2006.01)
(52) U.S. Cl. .............................. 235/462.09; 235/462.25
(58) Field of Classification Search ............ 235/462.09, 235/462.01, 462.06, 462.25, 462.26
See application file for complete search history.

(56) References Cited

U.S. PATENT DOCUMENTS

| | | | | |
|---|---|---|---|---|
| 3,666,925 A | * | 5/1972 | Marcus | ........................ 235/441 |
| 3,752,963 A | | 8/1973 | Herrin | |
| 4,115,931 A | * | 9/1978 | Futhey | ........................ 434/341 |
| 4,183,152 A | * | 1/1980 | Harris, III | .................... 434/341 |
| 4,194,302 A | * | 3/1980 | Takahashi | .................... 434/341 |
| 5,159,181 A | | 10/1992 | Bartels et al. | |
| 5,369,260 A | | 11/1994 | Schuessler | |
| 6,202,929 B1 | | 3/2001 | Verschuur et al. | |

FOREIGN PATENT DOCUMENTS

| | | |
|---|---|---|
| DE | 19816908 A1 | 10/1998 |
| GB | 2324396 A | 10/1998 |
| WO | WO 02/097709 A1 | 12/2002 |
| WO | WO 2005/027032 | 3/2005 |

OTHER PUBLICATIONS

European Search Report—Nov. 23, 2007.
European Office Action—Apr. 25, 2008.

* cited by examiner

*Primary Examiner*—Daniel St.Cyr
(74) *Attorney, Agent, or Firm*—Venable LLP; Eric J. Franklin

(57) ABSTRACT

A method for reading a code, which code comprises code elements and the first part of the code elements is substantially conductive and the conductivity of the second part is substantially different from that of the first part, in which method the reader couples to the code in a capacitive manner, in which case the signal level of the signal formed by the reader varies according to the conductivity of the code element, and a correction factor is determined of at least one code element for correcting the signal. In addition, the invention relates to a code reader and electric ink.

47 Claims, 10 Drawing Sheets

CODE READER

FIELD OF THE INVENTION

The invention relates to a method for reading a code with a reader. In addition, the invention relates to a code reader and electric ink for forming a code.

BACKGROUND OF THE INVENTION

It is known to form different machine-readable codes for different products. One manner is to form a code from an at least partly conductive material on a less conductive base material. For example, the code can be formed with conductive ink on paper or board. The conductive code can also in some cases be covered with another surface, which can be transparent or non-transparent.

Different solutions have been developed for reading a conductive code. One solution is presented in the U.S. Pat. No. 5,159,181, which discloses a capacitive code reader. The reader in question is based on identifying the conductive code in a capacitive manner with the electrodes of the reader, which electrodes are placed to correspond to the width of the code. Correspondingly, coupling areas are formed in the code at the locations of the electrodes of the reader. When the reader is at the location of the code, the electrodes of the reader and the code form a circuit and the alternating current (AC) between the electrodes is detected. In order for it to function reliably, the solution in question requires predefined mutual alignment of the code and the code reader, as well as precise reading direction. Because of this, it is mainly suitable for so-called card reader automatons, where the card comprising the code is brought to the reader aided by a motor. The solution does not operate reliably, for example, in such uses where the reader is moved in more unstable conditions e.g. by hand, in which case the speed, distance and/or direction in relation to the code may vary.

SUMMARY OF THE INVENTION

Now, a solution has been invented, which enables the more flexible reading of a conductive code.

To achieve this purpose, the method according to the invention is primarily characterized in that in the method the sensor head of the reader couples to the code in a capacitive manner, in which case the signal level of the signal formed by the reader varies according to the conductivity of the code element, and a correction factor is determined from at least one code element in order to correct the signal that is formed from the code. The code reader according to the invention is, in turn, primarily characterized in that the code reader is arranged to couple in a capacitive manner to a code, and arranged to form a signal, whose signal level varies according to the conductivity of the code element, and in addition, the code reader comprises a member, which is arranged to determine the correction factor for correcting the signal. The mobile device according to the invention is, in turn, primarily characterized in that the mobile device comprises at least a code reader, which code reader is arranged to couple to the code in a capacitive manner, and arranged to form a signal, whose signal level varies according to the conductivity of the code element, and the code reader in addition comprises a member in connection with a sensor head, which member is arranged to determine the correction factor for correcting the signal. The conductive ink according to the invention is, in turn, primarily characterized in that the conductive ink determines a code, which comprises code elements in such a manner that the first part of the code element is substantially conductive and the conductivity of the second part is substantially different from the first part, which code determined by the ink is arranged to couple in a capacitive manner to the reader in order to vary the signal level of the signal according to the conductivity of the code element in the reader, and that the correction factor for correcting the signal can be determined from the code element of the ink. The other, dependent claims present some additional embodiments of the invention.

One basic idea of the invention is to derive the correction factor to the code reader from a code that couples to it in a capacitive manner in order to correct a possible deviation caused by the signal reading event. The reader couples in a capacitive manner (e.g. electrostatically) to a code, which code comprises code elements, and the first part of the code elements is substantially conductive and the conductivity of the second part is substantially different than that of the first part. The code can be read e.g. by sweeping the sensor head over the code. Thus, the signal level of the signal formed by the sensor head varies according to the conductivity of the code element. Sweeping may cause deviations or errors in the signal determined by the code. The correction factor that can be derived from the code, which factor correlates with the error caused by the reading event, and helps to correct the read signal.

In an additional embodiment of the invention, the code data read by the sensor head is collected in a control unit, which identifies the start pattern and the end pattern of the actual code in the read code data. On the basis of the geometric structure and/or the electric properties of the actual code the control unit forms a data describing the actual code.

In one of several additional embodiments, the position of the electrode can be identified in relation to the code, even if the start pattern of the sweeping and the speed or its fluctuation or even the direction of the sweeping is not known exactly. This facilitates the reading of the capacitive code in a hand held manner. In yet another additional embodiment the location of the sensor and the speed of the sensor are identified on the basis of the form of the code. Further, in one of several additional embodiments the beginning and/or the end of the code is identified from some agreed code pattern. The effect of the mutual speed variation between the sensor head and the code is diminished in one additional embodiment in such a manner that each code pattern is composed of a known structure, in which case the speed has to be only roughly constant in the area of one pattern.

In one of several additional embodiments the reader is arranged to identify one code (i.e. a code that starts from the start pattern and ends at the end pattern) independent of where the sweeping of the reader is started. In the embodiment in question the reader is arranged to form an entire code from the flow of code parts identified by the sensor head, i.e. the code flow in such a manner that the control unit reads the code flow into the memory, from where the start pattern of the code and the end of the code are recognized. In an additional embodiment the code can be identified independent of the direction the code is being read from. Also the mutual speed of the sensor head and the code may vary in an embodiment.

The reading technique can be implemented in such a manner that it does not disturb the electronic devices and/or data transfer. This enables the placement of the reader and other functions in the same structure.

In one of several additional embodiments the reader is a hand-held device, with which the codes are read in a hand-held manner.

The solution according to some additional applications also enables the use of different conductive inks in forming codes, because, for example, some inks are conductive on a high enough frequency, even though they would be poorly conductive at lower frequencies.

DESCRIPTION OF THE DRAWINGS

In the following, the invention will be described by several examples with reference to the appended principle drawings, in which.

For the sake of clarity, the figures only show the details necessary for understanding the invention. The structures and details that are not necessary for understanding the invention but are obvious for anyone skilled in the art have been omitted from the figures in order to emphasize the characteristics of the invention.

DESCRIPTION OF THE ADDITIONAL EMBODIMENTS OF THE INVENTION

The reader 1 and the reading technique according to the additional embodiments of the invention are described hereinbelow together with the code 2. In the example, the code 2 being used is a bar-code-like code formed on paper with conductive ink, whose dimensions are in the range of a few centimetres. The code may, however, differ from the code presented as an example, for example, in its form, size, substrate or conductive material. According to some additional embodiments of the invention, the code 2 can be identified with an electric reading technique, such as, for example, a capacitive code reader 1.

Figure 1:
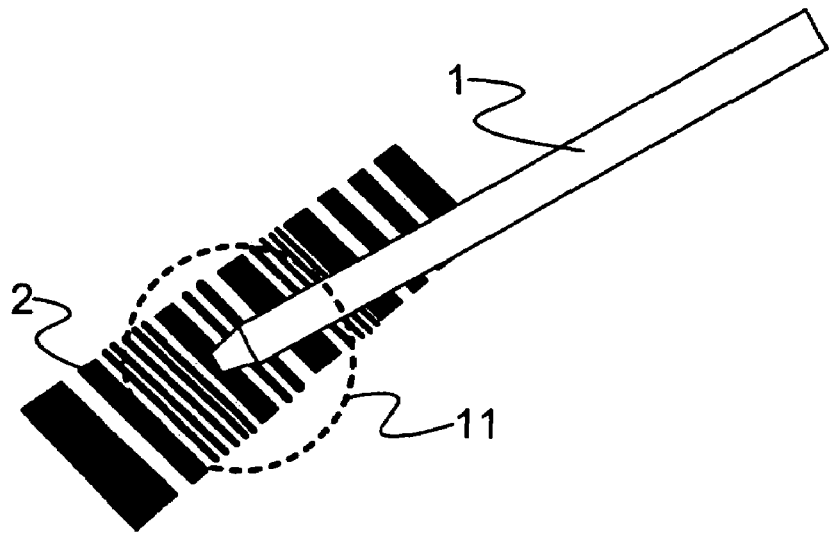
FIG. 1 shows a code reader according to an additional embodiment of the invention.
Figure 2:
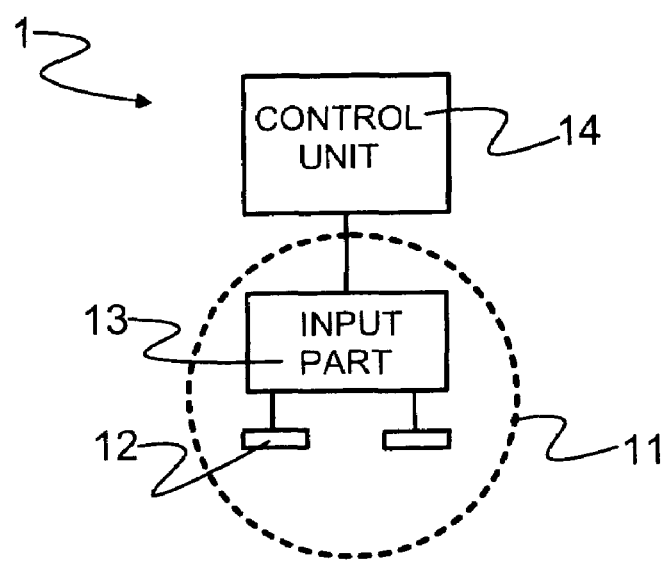
FIG. 2 shows a code reader according to an additional embodiment of the invention in a block diagram.

FIG. 1 shows an additional embodiment of the reader 1 according to the invention, as well as a part of the conductive code 2, which comprises code elements, i.e. in the example bars and spaces. In the example the reader 1 is formed in the shape of a pen. The tip of the reader 1 has a sensor head 11, where the electrodes 12 described later in FIG. 2 are located. In the described embodiment, an individual electrode 12 has dimensions of approximately 0.1 mm×0.1 mm and the distance between two electrodes is approximately 0.1 mm. The dimensions and the placement of the electrodes 12 has an effect on, inter alia, how narrow code elements of the code 2 are detected with the device 1. By arranging the distance between the electrodes 12 to be smaller than, for example, the width of a bar of the code 2, it is possible to detect the code element independent of the mutual position of the sensor 11 and the code. The solution is independent of the orientation of the electrode 12 in relation to the code 2.

The reading accuracy of the electrodes can be affected with guard electrodes. For example, when electrodes of the size 100 μm are surrounded from all sides from a distance of 100 μm, it is possible to read relatively reliably bar widths of even less than 200 μm when the reading distance is some tens of μm:s.

FIG. 2 shows an additional embodiment of the reader 1 in a diagram. The reader 1 according to the example comprises a sensor head 11 and a control unit 14. The sensor head comprises, inter alia, electrodes 12 and a measuring electronics 13, which is arranged to measure the capacitance between the electrodes. The measuring electronics 13 incorporates, inter alia, a signal generator that feeds an AC-signal to one electrode and a preamplifier that senses the response of said AC-signal from another electrode. The control unit 14, in turn, comprises means for processing the signal produced by the sensor head 11 in order to determine the code 2.

In order to minimize the electrodes 12, the measuring electronics 13 must be as sensitive as possible, because the capacitive connection to a conductive surface depends on the area of the electrodes 12. In order to create a sensitive enough reading, inter alia, the following issues are to be considered:

a high enough operating frequency, because the capacitive impedance is inversely proportional to the operating frequency.

small dimensions in the conductors, i.e. the measuring electronics 13 close to the electrodes 12, which reduces the stray and coupling capacitances and thus improves the sensitivity of the preamplifier.

The operating frequency also has an effect on how the code 2 can be formed. For example, with a high frequency, the conductivity of some conductive inks is improved, and therefore the inks can best be read with a high-frequency reader 1. On the other hand, electronics is often simpler with lower frequencies. In experimental checks so far, the read frequency of 500 kHz to 10 MHz has been proven good. In some embodiments, a frequency of approximately 1 MHz has been sufficient.

The placement of electrodes 12 and their connection to the measuring electronics 13 can be implemented, for example, with printed circuit boards. The electrodes can be placed in such a manner that the length of the conductor for the preamplifier is below 30 mm. The conductors between the electrodes and the preamplifier can be routed in such a manner that the coupling capacitance between the conductors is minimized. Thus, the basic coupling capacitance between the electrodes 12 without any code close to the electrodes 12 can be tens of femtofarads. The change in the capacitance caused by the code is typically approximately one femtofarad or even less. Measuring capacitance changes of less than one femtofarad on the basic coupling capacitance of tens of femtofarads is successful substantially in a reliable manner when an impulse operating frequency of, for example, 1 MHz is used. It is worthwhile to select the frequency according to the impedances (i.e. in practice, the stray and coupling capacitances of the electrodes) as well as the noise properties and frequency response of the preamplifier being used. The sweeping speed of the sensor head over the code, in turn, has an effect on determining the bandwidth of the measuring electronics 13.

In the additional embodiment according to FIGS. 1 and 2, a direct capacitance measurement is used. In the embodiment, the connection of the signal to the conductive ink is measured directly. Thus, the change of capacitance between the electrodes 12 is measured directly. When the measurement is almost touching, a reliable reading is achieved with the capacitance measurement even without any electrostatic shield between the electrodes 12.

When in some embodiment the code 2 is poorly detectable with the eye, such as, for example, invisible, and reading takes place by sweeping by hand, the position of the electrodes 12 in relation to the code 2 must be recognizable, even if the starting point and speed of the sweeping or its variation or even the direction of sweeping are not exactly known. Identification of the position and speed is performed on the basis of the code 2.

Figure 3:
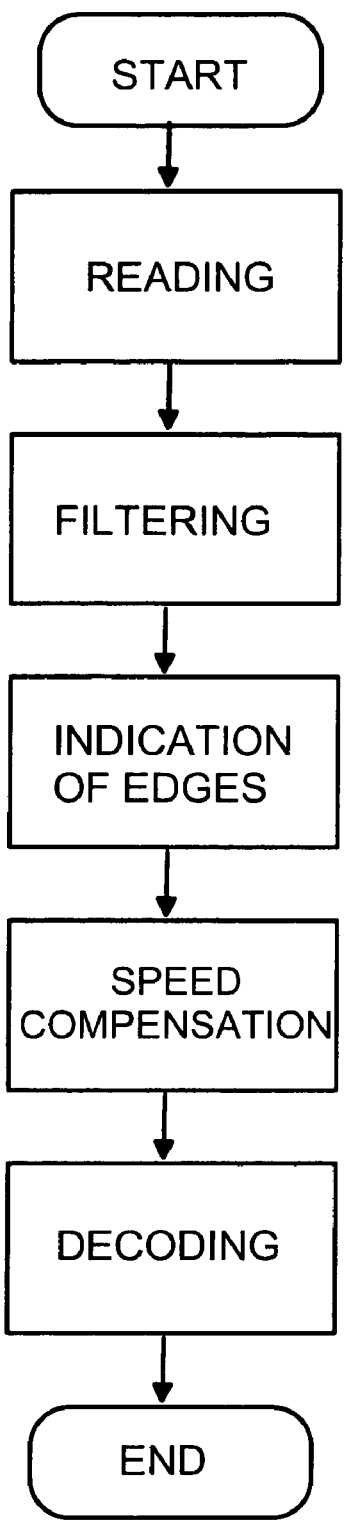
FIG. 3 shows code reading according to an additional embodiment in a flow chart.

The flow chart of FIG. 3 presents the main characteristics of a reading event in principle. When the code 2 is read with the reader 1, the sensor head 11 forms a raw signal that is proportional to the capacitance measured by the measuring electronics 13. The raw signal is filtered, in which case it is possible, for example, to reduce noise by low-pass filtering or the variation of the base level (signal level without any code close to the electrodes 12) by high-pass filtering. The filtering makes detection of edges more reliable.

The detection of edges can be made, for example, by using a fixed or adaptive edge detection thresholding. After the edge detection, a two-state (binary) signal is received, which reflects whether the conductive code element of the code 2 is under the sensor head or not.

Alternatively if the cutoff frequency of the high-pass filtering is high, the signal becomes differentiated. Thus, the signal caused by the code varies on both sides of its DC-level, so that the rising edge causes a positive peak and the descending edge causes a negative peak. The edges of the signal level can be detected by placing a threshold detector on both sides of the DC-level.

Alternatively, the filtered signal can be converted to a digital form with an A/D converter. The identification of edges can in this case be implemented with some digital signal processing means.

In an additional embodiment, in the identification of the bar and space widths is also utilized the variation of the signal amplitudes and transition times. This can be reasonable if the density of the bars is great in relation to the reading resolution of the reader 1.

After the detection of the signal, in the memory of the reader 1 is stored either a two-level signal, the signal stored in the memory is either a binary signal, which changes its state at the detected edges, or an A/D-converted signal. This signal typically comprises deviation caused by variation in the sweeping speed.

Figure 4:
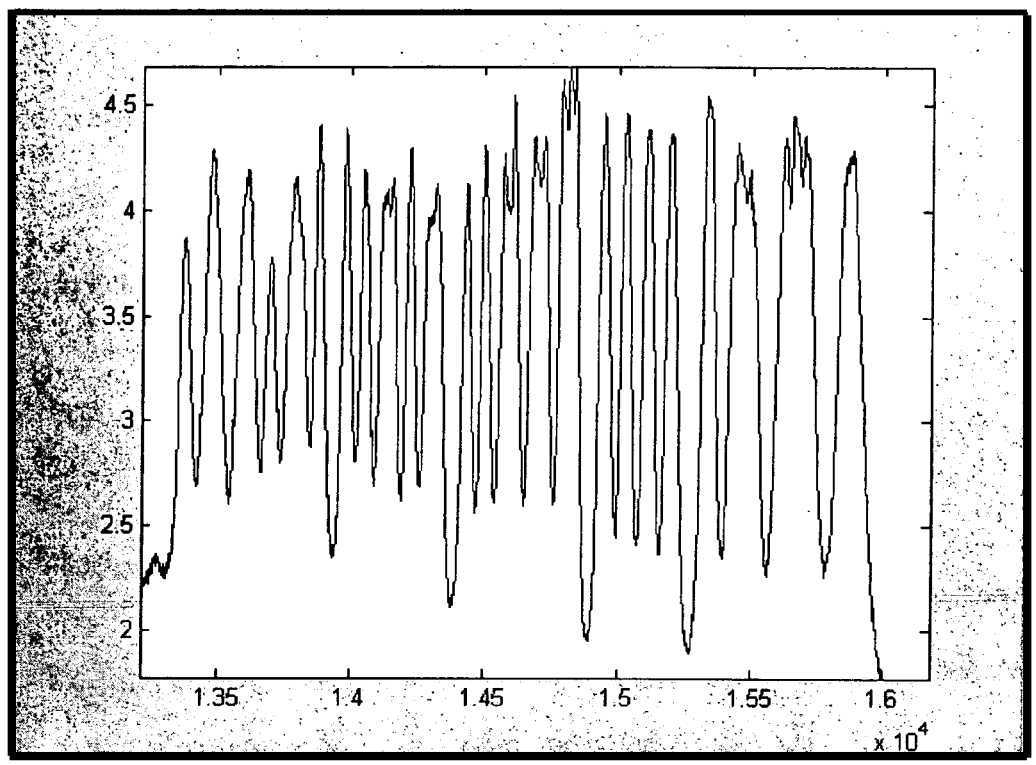
FIG. 4 shows an example of a code signal.

FIG. 4 shows an additional example of a filtered signal. The identification of a code may begin either by identifying the shifts from one state to another with an edge detector (or by identifying the peaks of a differentiated signal). The level of the signal varies between the conductive code element of the code 2 and the non-conductive code element. If the DC-level of the signal does not vary substantially, it is possible in some embodiments to use a fixed thresholding directly to identify whether the conductive code element of the code 2 is under the sensor head 11 or not. The temporal distance between two successive edges depends on the width of the conductive code element and the non-conductive code element of the code 2 (bar and space) and the sweeping speed of the reader 1.

After the detection of the edges of the signal, a speed compensation is performed, for example, in one of the manners presented later. After the speed compensation, it is possible to determine the relative widths differences of the code elements of the code 2. The decoding of the code 2 is implemented according to the agreed coding (for example, according to some standard).

Next, several methods and arrangements for decoding the code 2 for example when the location of the code is roughly known are presented. The beginning and end of the code 2 can be identified from the agreed code patterns. The variation of the sweeping speed of the reader 1 can be compensated, for example, in the following manners:

The coding may be based on, for example, the variation of conductive and non-conductive code elements, i.e. for example, the variation of the widths of the conductive bars and non-conductive spaces. Thus, the code 2 can be identified even though the absolute speed of the sensor head 11 is not known. The speed must remain substantially constant during the entire sweeping in order for the decoding to succeed with this method.

The meaning of the widths of the bars and spaces of the code 2 is interpreted as patterns or bits according to some known coding method (symbology). Typically some fixed length pattern is agreed, which comprises the agreed number of bars and spaces. For each different character being coded (e.g. all number and letters) is agreed a code pattern, where the widths and positions of the bars and spaces are agreed. The code can also be such that it does not comprise predefined patterns, but the data is coded with some known algorithm as bars and spaces.

When printing the code, the widening of the conductive bars may take place. Thus, it is possible to use a code identification method, where, instead of the widths of the bars, the distances are identified always between similar edges (for example, from the left edge of the first bar to the left edge of the next bar).

In the following, some speed compensation manners will be presented.

In some additional embodiments, the reading speed is assumed as constant on certain periods. Thus the data is examined over a period determined in a suitable manner. For example, a code period is examined (which may represent, for example, one pattern or one data byte), which comprises the amount of N of conductive code elements, i.e., for example, bars. In order to remove the significance of speed in decoding, in this case the structure of the code must be known. In an additional embodiment is used a code structure, where the lengths of the N bars (and N−1 spaces) are constant independently of the pattern. When the speed is assumed as constant in the area of the pattern, it is enough that the wide code elements are identified from the signal. In another additional embodiment it is, in turn, possible to determine the speed in such a manner that, for example, the shortest, longest and/or the average for the duration of the code element are searched from the group of code elements of the code, on the basis of which the speed is determined. For example, in the Code39-type bar codes each pattern consists of five bars and four spaces; three of these nine elements are wide and six narrow. In this embodiment, the absolute value of the width of the code element is not decisive, but the ratio of the widths of the wide and narrow code elements. For example, it can be determined that a wide code element (a bar and/or space in the example) is 2 times wider that a narrow bar code element. Thus, the speed between the sensor head 11 and the code 2 does not decide the reading of the code 2, but the width of the code element is concluded from the time difference between the edges of the signals formed in sweeping. On the basis of this the reading is reliable when the speed remains substantially constant over the one pattern of the code 2 even if the speed is unknown.

In some of the various additional embodiments the speed correction is determined locally for a code. Thus, the time axis of the signal is adjusted with some formula, which corrects the change of the speed (for example linearly). A adjusting (i.e. the adjusting of the time axis) can be implemented in several different manners, such as, for example:

In an embodiment the adjusting is based on the speed of adjacent patterns or bar/space groups. Thus, it is assumed that the reading speed at the beginning of a pattern of one N code element is the (average) speed of the previous pattern or bar/space group and at the end of the pattern the speed of the following pattern. On the basis of these, it is possible to adjust the time axis of the signal in a linear manner before the code elements are identified i.e. for example wide and narrow bars.

In a second embodiment, in turn, the sweeping speed is identified in the beginning and the end of the pattern. Thus, it is agreed that the first and last code element of a pattern are predefined i.e. either "narrow" or "wide". The speed correction is calculated based on the duration of these.

It is also possible to determine that some other one of the patterns and/or code elements of a certain part of the code is of a certain size. For example, one of the first three and last three code elements can be "narrow". By identifying the most narrow code element, it is possible to determine the speed and the required adjusting parameters. Thus, the data density of the code increases, because no specific individual code element is determined as narrow.

By determining the speed on the basis of several known patterns and/or code elements, a more versatile formula can be used for speed correction. For example, by determining the speed on the basis of at least three known code elements, the speed can be corrected with a quadratic equation.

Instead of known patterns and/or code elements, it is possible to use some other known length quantity to determine the speed. For example, speed can be determined when it is known that the combined length of a certain code element group is substantially constant.

It is also possible to make a speed correction over the entire range of the sweeping. Thus, the sweeping speed is determined in the manners described above, after which the formula is arranged to correct the speed variation. In many uses, a quadratic equation at the most has been detected to be enough.

Figure 5:
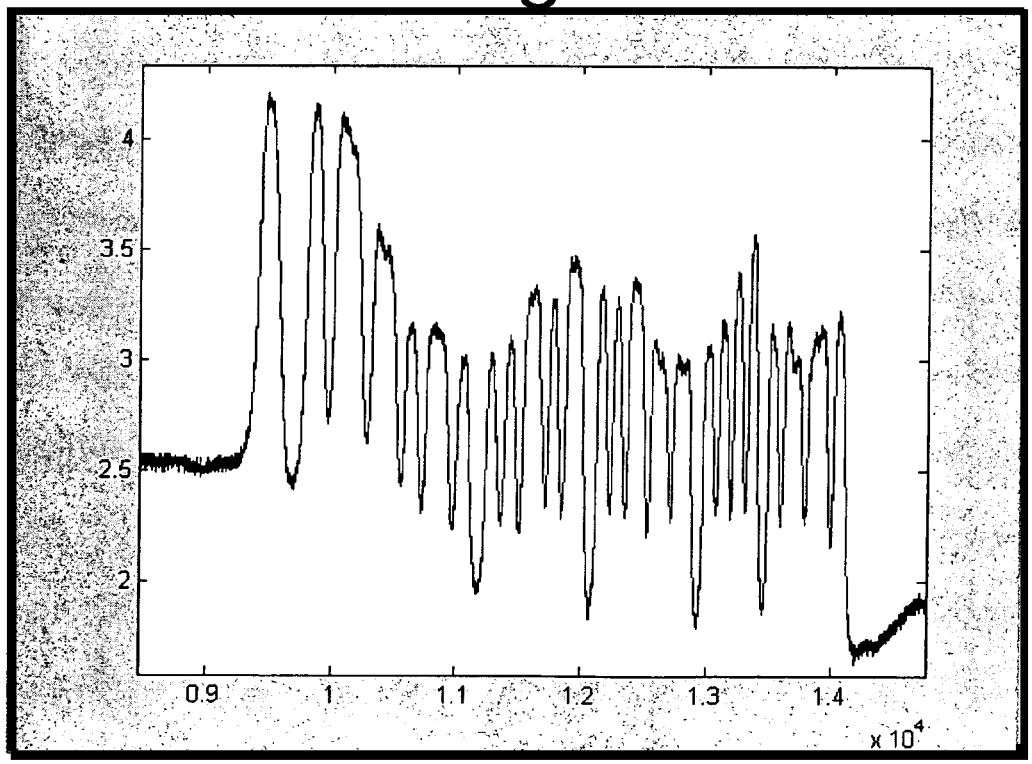
FIG. 5 shows another example of a code signal.

FIG. 5, in turn, shows another additional example of a filtered signal, where the sweeping speed changes notably. The code 2 being read is the same as in the example presented in FIG. 4.

Figure 6:
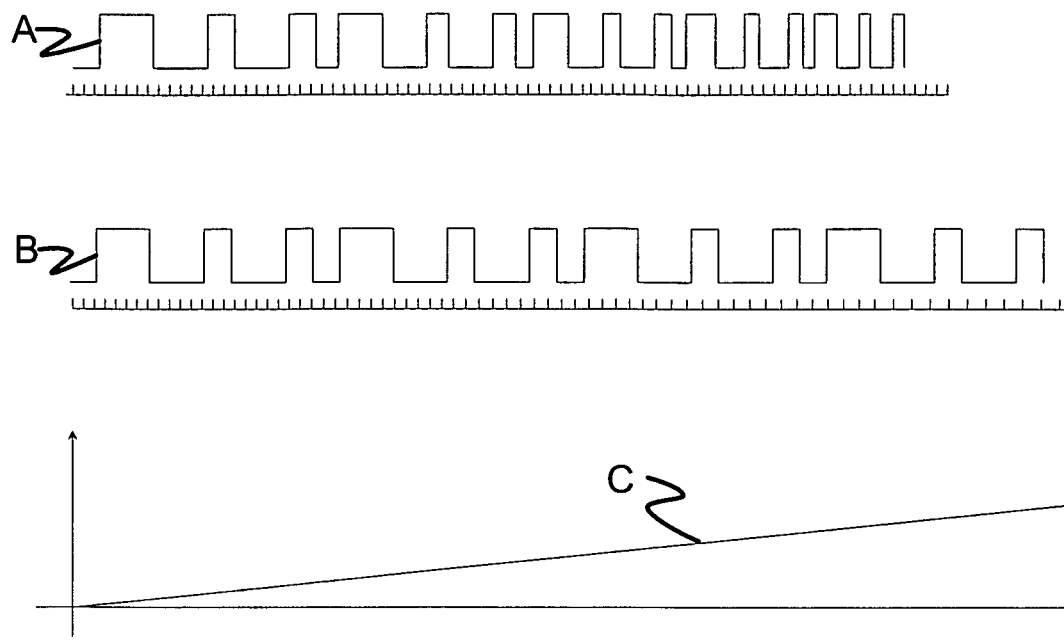
FIG. 6 shows an example of speed correction.

FIG. 6 shows the principle of speed correction as a simplified example. Graph A shows the signal before the speed compensation. As can be detected from graph A, the sweeping speed of the reader 1 has increased in relation to the code 2 towards the end of the sweeping. In the example the change of speed is linear in respect of time. Graph B shows the speed-compensated signal. FIG. C, in turn, shows the correction factor used for speed compensation. In the example, the correction factor is a linear graph, because the change of speed is linear. Naturally, the form of the graph C of the correction factor depends on the variation of the sweeping speed of the reader 1. The speed-compensated signal B is formed from the non-compensated signal A by adjusting the time axis with the correction factor C. The principle is that when the sweeping speed has increased, the time axis is stretched, i.e. a greater factor is used than with lower speeds.

Figure 7:
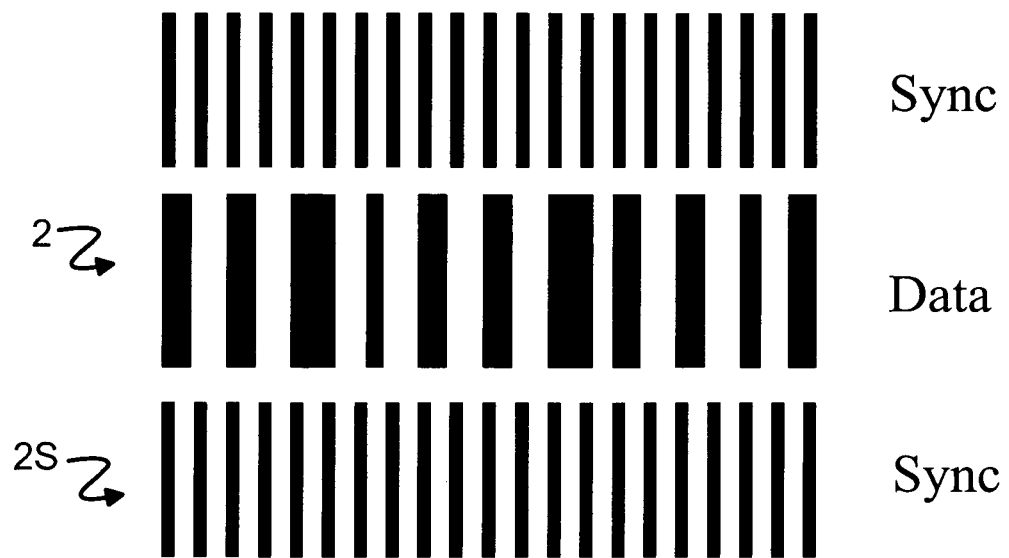
FIG. 7 shows an additional embodiment of the code.

In an additional embodiment, a synchronization code 2S is used in addition to the actual code 2, as is presented in FIG. 7. The synchronization code 2S is placed in connection with the actual code 2, or in its vicinity, such as, for example, next to the code either on one side or both sides. Thus, several sensor heads 11 can be placed in a row, in which case there are so many sensor heads that both the code 2 and the synchronization pattern 2S become read. In an additional embodiment there is an individual sensor head 11 for the synchronization code 2S.

In one of several additional embodiments capacitive sensor heads 11 are placed at least two consecutive units in relation to the sweeping direction of the reader 1. Thus, it is possible to determine the speed of the read sweeping on the basis of the signals produced by these sensor heads 11. In an embodiment this is based on that when the code 2 read by both sensor heads 11 is the same, also the signals formed by them are very similar, but there is a delay between them. The delay depends on the distance between the consecutive sensor heads 11 and the sweeping speed. Typically, the distance between consecutive sensor heads 11 is known, in which case the sweeping speed can be determined on the basis of the delay. The delay can be analyzed, for example, by the time differences of the pulses created by individual code elements or by taking a longer sample of the signal and by searching the delay where the correlation of the signal is at the maximum.

Figure 8:
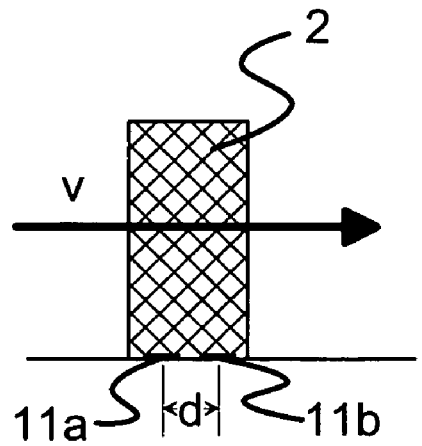
FIG. 8 shows an additional embodiment equipped with two sensor heads.

FIG. 8 shows a reading event, where two consecutive sensor heads 11a and 11b are swept over a code element. The sweeping takes place with a momentary speed v and in the figure the measure d describes the distance between the sensor heads 11a and 11b. Thus, the delay between the output signals from the sensor heads 11a and 11b is d/v. On the basis of the speed determined in this manner it is possible to adjust the time axis in a similar manner as is presented previously.

Figure 9:
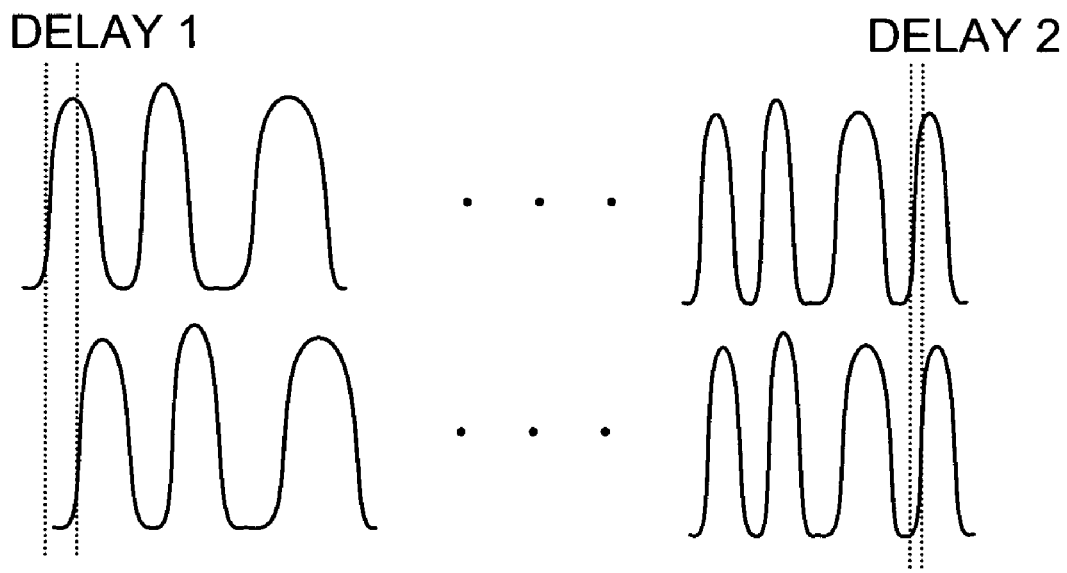
FIG. 9 shows a signal of the embodiment according to FIG. 8.

FIG. 9 describes the signals formed by the above-presented sensor heads 11a and 11b when the sweeping speed increases significantly during the sweeping. Thus, the delay between the output signals from the sensor heads 11a and 11b in the beginning of the data is greater than in the end of the data.

Yet in another additional embodiment, the reading direction is also known, for example from left to right. It is also possible to implement the code and its reading in such a manner that, for example, a ±20 degree direction error can be accepted. In an additional embodiment this is achieved by printing the code 2 high enough in relation to its length.

Figure 10:
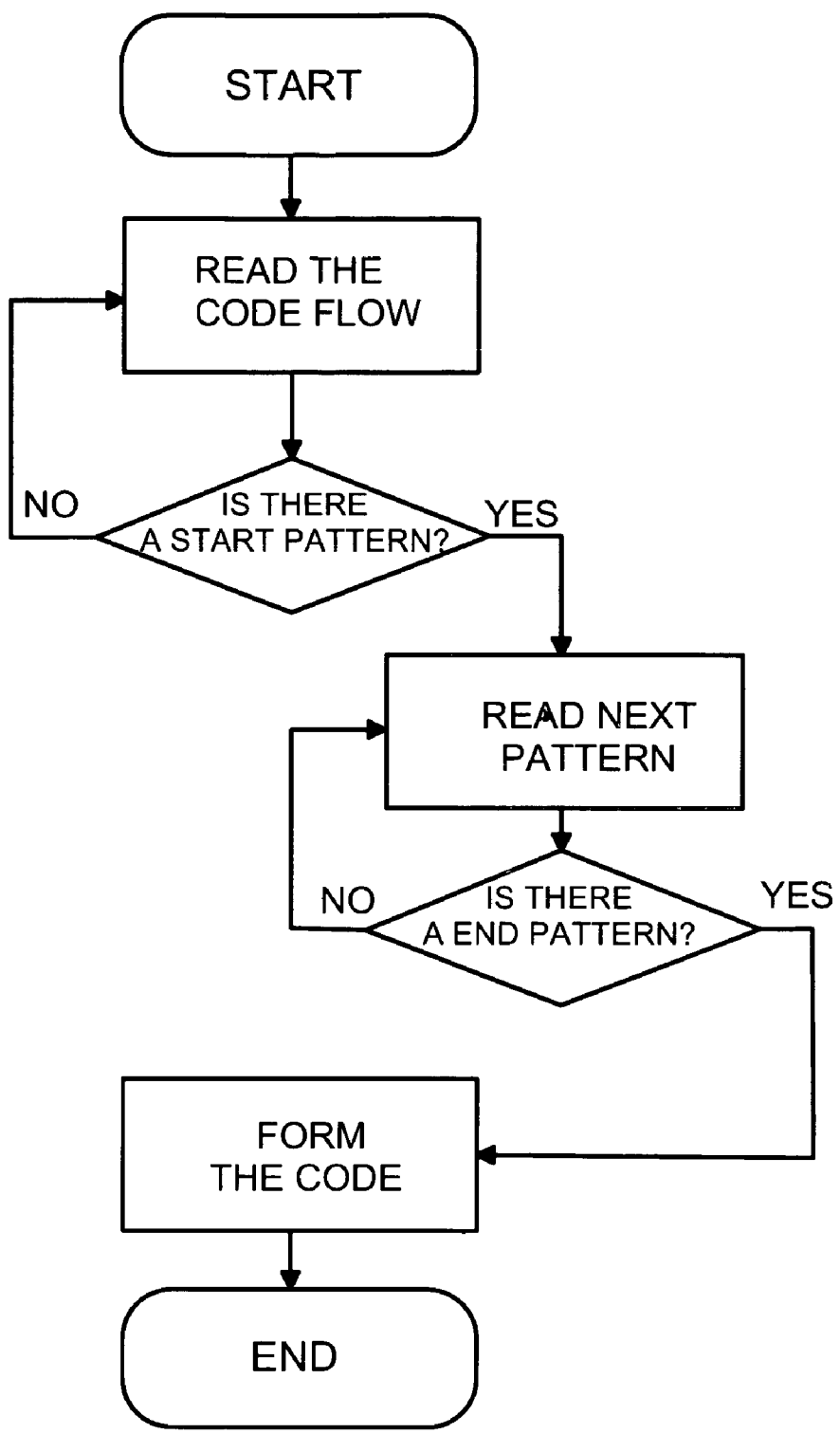
FIG. 10 shows code processing according to an additional embodiment in a flow chart.
Figure 11:
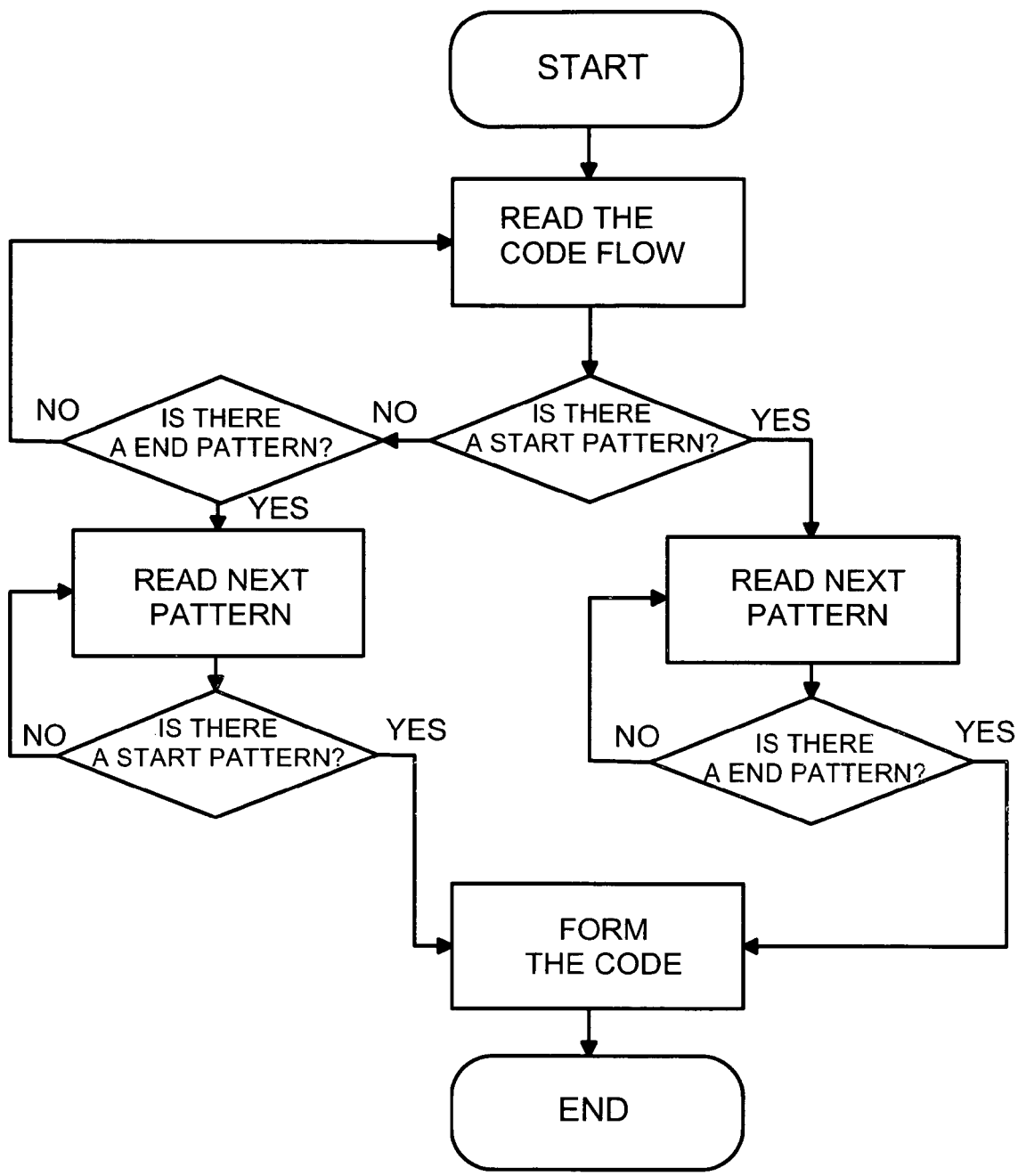
FIG. 11 shows code processing according to another additional embodiment in a flow chart.

In a usage environment according to the applications, the code being read is formed as a repeating sequence. Thus, the reader 1 according to an embodiment of the invention is arranged to identify one code (i.e. code that starts from the start pattern and ends at the end pattern) independent of where the sweeping of the reader is started. An example of the embodiment in question is presented in FIG. 10 as a flow chart. In the embodiment in question the control unit 14 is arranged to decode an entire code from the flow of code elements identified by the sensor head 11, i.e. the code flow in such a manner that the control unit reads the code flow into the memory, from where the beginning of the code is identified on the basis of the start pattern and the end of the code on the basis of the end pattern. After this the contents of the code can be concluded to be between them. In an additional embodiment the code 2 can be identified independent of the direction the code is being read from. I.e. for example, the code 2 can be read from the end pattern towards the start pattern. An example of the embodiment in question is presented in FIG. 11 as a flow chart.

Figure 12:
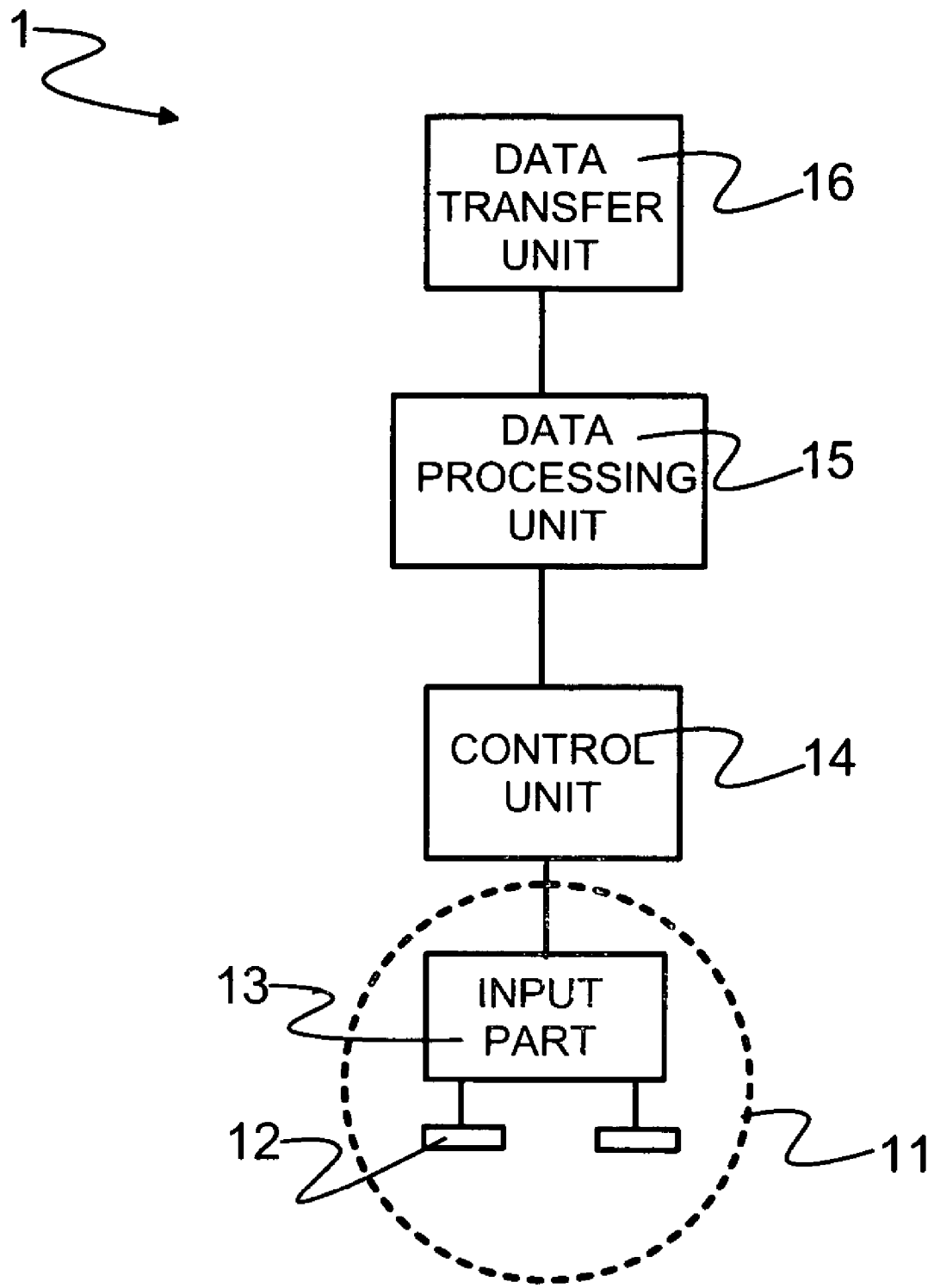
FIG. 12 shows a code reader according to another additional embodiment in a flow chart.

FIG. 12, in turn, shows another embodiment of the reader 1 in a chart. The reader 1 according to the example comprises a sensor head 11 and a control unit 14, whose operation is described above. The control unit 14 is in this embodiment in connection with the data processing unit 15, which is arranged, inter alia, to operate according to the control data comprised by the code 2. In addition, a data transfer unit 16 is shown in the example, via which the reader 1 is in connection with other devices and/or systems.

For example, the reader 1 can be connected to a mobile device, a communication device, an electronic notebook and/or a palm computer. It is also possible that the reader 1 is a separate unit, which is in connection with another device, such as, for example, a mobile device, a communication device, an electronic notebook and/or a palm computer, by means of a suitable data transfer technique. In an additional embodiment the code reader 1 is placed in the same structure with the stylus of a touch screen, in which case it is possible to read codes and control the device with the same unit. Data can be transferred between the reader 1 and other devices, for example, with IR (Infrared) or Bluetooth technique.

Figure 13:
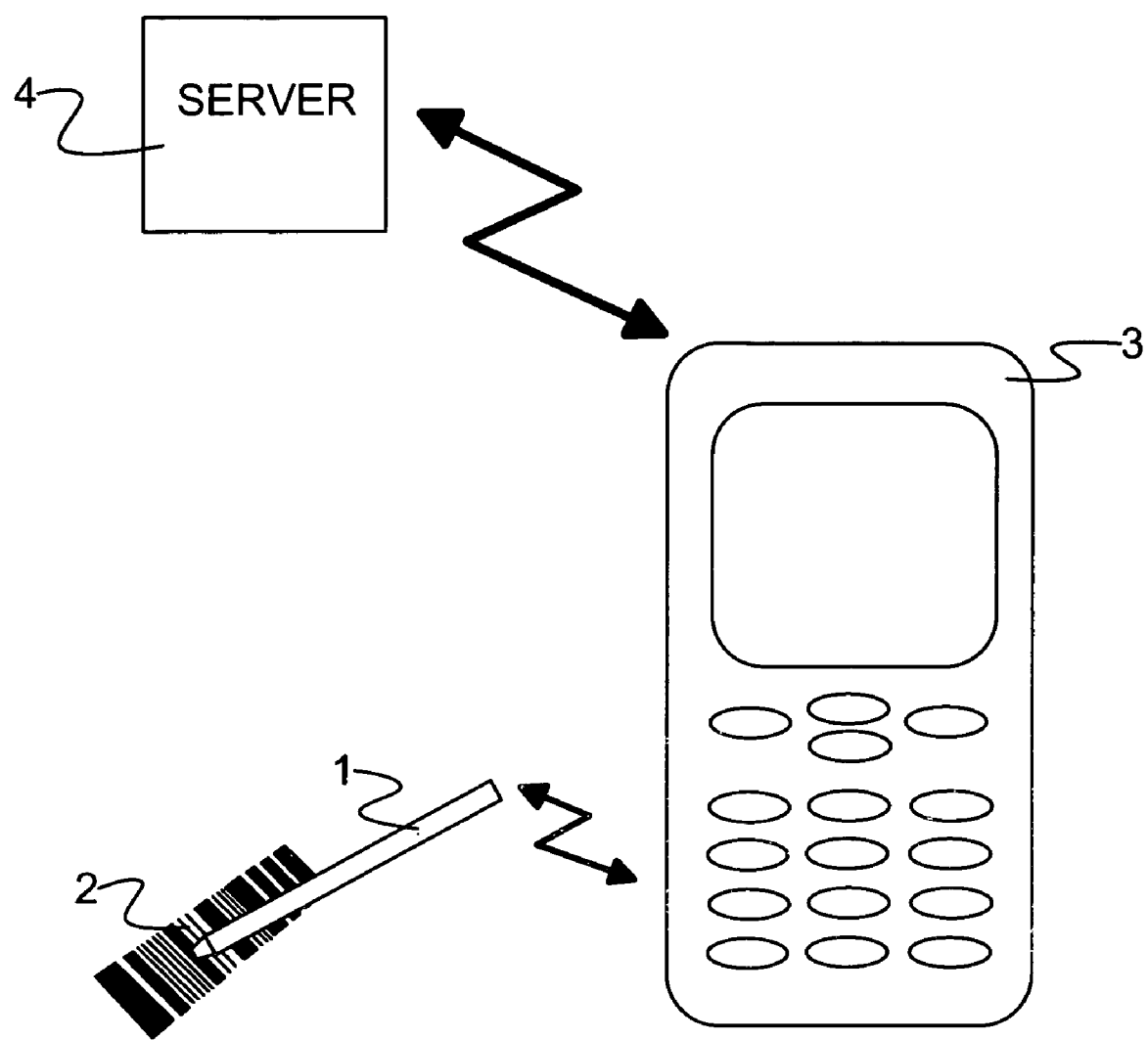
FIG. 13 shows a system in which the embodiments of the invention can be applied.
Figure 14:
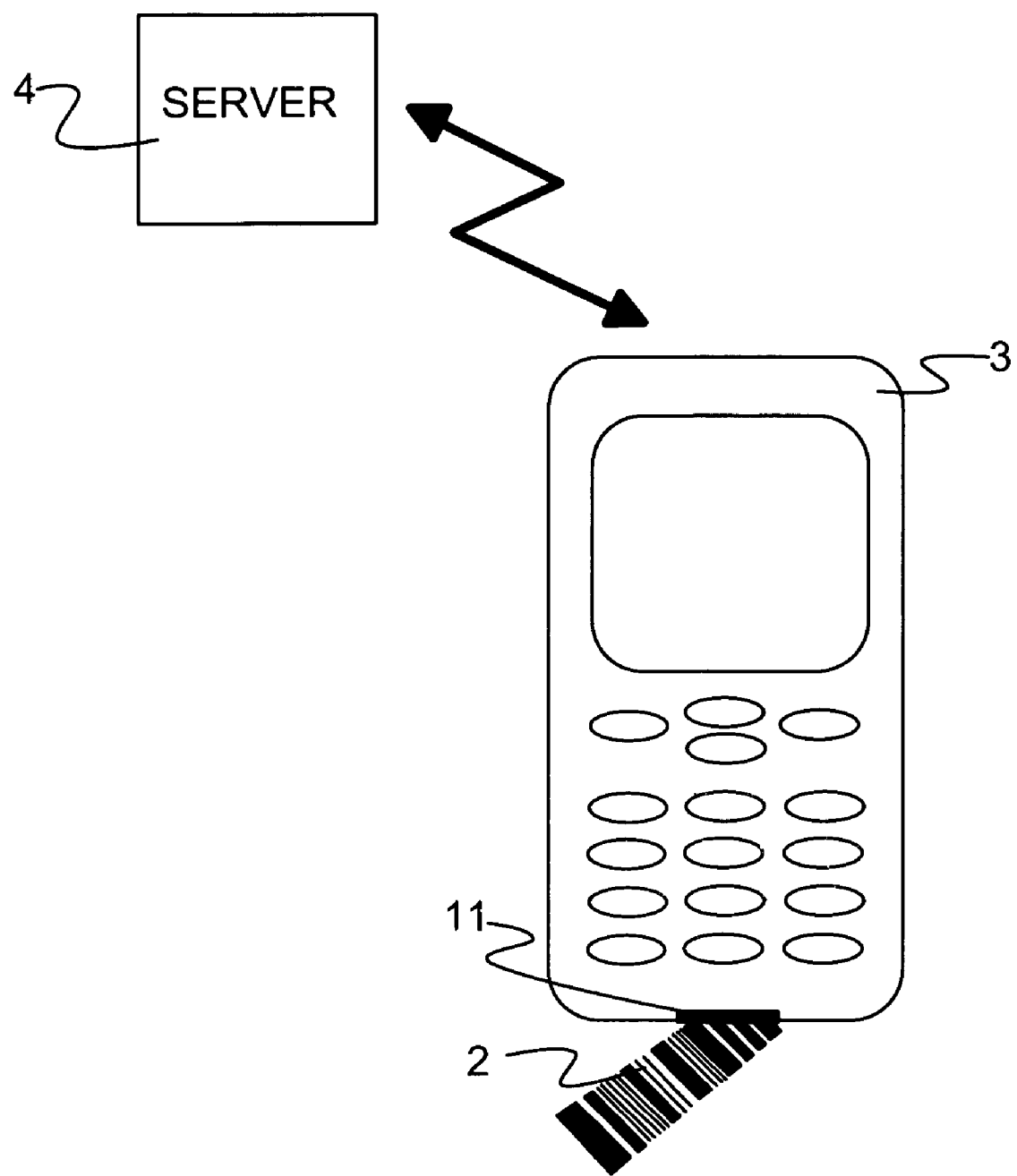
FIG. 14 shows another system in which the embodiments of the invention can be applied.

By arranging the reader 1 in connection with some other system, it is also possible to provide and use different services. For example, FIGS. 13 and 14 show some system assemblies, which comprises a code reader 1, a communication device 3 and a server 4. In the example shown in FIG. 11, a separate code reader 1 is in a data transfer connection with a communication device 3, but the devices can also be integrated, as is shown in FIG. 14. The communication device 3 is in turn arranged in connection with the server 4.

By combining, in various ways, the modes and structures disclosed in connection with the different embodiments of the invention presented above, it is possible to produce various embodiments of the invention in accordance with the spirit of the invention. Therefore, the above-presented examples must not be interpreted as restrictive to the invention, but the embodiments of the invention may be freely varied within the spirit and/or nature of the invention.

The invention claimed is:

1. A method, comprising:
    capacitively coupling a reader to a first code comprising code elements, wherein a first part of the code elements is substantially conductive and a conductivity of a second part of the code elements is substantially different from a conductivity of the first part of the code elements;
    forming with the reader a signal that is proportional to a capacitance between the first code and the reader, wherein a level of the signal varies according to the conductivity of the code elements;
    detecting edges of the signal;
    determining a width of the code element based on a time difference between the edges of the signal;
    deriving a correction factor from the code elements by determining at least one of a shortest, a longest or an average for the duration of the code elements, wherein the correction factor correlates with a deviation in the signal caused by the reading; and
    adjusting the signal based on the correction factor.

2. The method according to claim 1, wherein adjusting the signal takes place on the time domain of the signal.

3. The method according to claim 1, wherein the second reader is arranged to read said code a second time in such a manner that the correction is performed from the delay between the signals.

4. The method according to claim 1, wherein adjusting the signal is linear on the reading range of the first code.

5. The method according to claim 1, wherein adjusting the signal changes on the reading range of the first code.

6. The method according to claim 1, wherein the code comprises a pluralilty of code elements for correcting the signal.

7. The method according to claim 6, wherein the correction is based on comparing predefined code elements.

8. The method according to claim 7, wherein the predefined code elements are located in the beginning and the end of the first code.

9. The method according to claim 6, wherein mutual size differences of the code elements are identified based on an amplitude of the signal level.

10. The method according to claim 6, wherein a speed of the reader in relation to the code is determined based on mutual size differences of the code elements.

11. The method according to claim 6, wherein a speed correction used for interpreting the code is determined based on mutual size differences of the code elements.

12. The method according to claim 1, wherein the first part of the code element comprises conductive ink.

13. The method according to claim 1, wherein said correction factor is received from a second code separate from the first code.

14. The method according to claim 13, wherein the second code is located above and/or below the first code.

15. The method according to claim 13, wherein the reader is configured to read the second code simultaneously with reading the first code.

16. The method according to claim 2, wherein said correction factor is configured to correct the signal deviation caused by the changes in a reading speed of the code.

17. The method according to claim 6, wherein mutual size differences of the code elements are identified based on the duration of the signal level.

18. The method according to claim 12, wherein the ink is arranged to be conductive on a frequency of an electromagnetic field generated by the reader.

19. The method according to claim 1, wherein the code comprises at least two bars having a same conductivity.

20. The method according to claim 1, wherein the code comprises a plurality of bars having conductivity values that are substantially different from each other.

21. A hand-held code reader for reading a first code comprising code elements, wherein a first part of the code elements is substantially conductive and a conductivity of a second part of the code elements is substantially different from a conductivity of the first part of the code elements, and wherein the reader is configured to capacitively couple to the first code and form a signal that is proportional to a capacitance and the code reader is arranged to form an output signal during a reading event, a signal level of the output signal varies according to the conductivity of the code element, the reader comprising:
    a member arranged to determine a correction factor based on the code elements, wherein the reader is adjusted to detect edges of the signal and to determine a width of the code elements from time difference between the edges, wherein the correction factor corrects for the signal and the reader is arranged to derive the correction factor from the code elements by determining a shortest, longest and/or an average for the duration of the code elements, and wherein the correction factor correlates with a deviation in the signal caused by the reading event and the reader is adjusted to correct the read signal on the basis of the correction factor.

22. The code reader according to claim 21, wherein the member is configured to determine said correction factor from at least one code element.

23. The code reader according to claim 22, wherein the member is configured to adjust the signal for correcting the signal based on the correction factor.

24. The code reader according to claim 23, wherein the member is arranged to adjust the signal on a time domain.

25. The code reader according to claim 23, wherein the member adjusts the signal in a linear manner on a reading range of the code.

26. The code reader according to claim 23, wherein adjusting the signal changes on the reading range of the code.

27. The code reader according to claim 22, wherein the member is arranged to receive said correction factor from a second code that is separate from the first code.

28. The code reader according to claim,22, further comprising:
a second reader configured to read said code a second time in such a manner that the member is arranged to perform the correction from the delay between the signals.

29. The code reader according to claim 21 wherein the code reader is configured to determine mutual size differences of the code elements according to the detected edges of the signal.

30. The code reader according to claim 21 wherein the member is arranged to determine the correction factor from several code elements, and wherein the code comprises several code elements for correcting the signal.

31. The code reader according to claim 27, wherein the reader is arranged to read the second code simultaneously with reading the first code.

32. The code reader according to claim 22, wherein said correction factor is configured to correct the signal deviation caused by the changes in the reading speed of the code.

33. The code reader according to claim 30, wherein the correction is based on comparing predefined code elements.

34. The code reader according to claim 33, wherein the predetefined code elements are located in the beginning and the end of the code.

35. The code reader according to claim 27, wherein the second code is located above and/or below the first code.

36. The code reader according to claim 21, wherein the code reader is arranged to determine mutual size differences of the code elements according to the amplitude of the signal level.

37. The code reader according to claim 21, wherein the code reader is configured to determine the speed of the reader in relation to the code based on mutual size differences of the code elements.

38. The code reader according to claim 21, wherein the code reader is configured to determine the correction factor used in interpreting the code based on mutual size differences of the code elements.

39. The code reader according to claim 21, wherein the code reader comprises a sensor head comprising two or more electrodes.

40. The code reader according to claim 39, wherein the two or more electrodes are arranged in the code reader such that they are consecutive in relation the reading direction of the code.

41. The code reader according to claim 21, wherein the coder reader is connected to at least one of the following: a mobile terminal, a communication device, an electronic notebook, a personal digital assistant.

42. The code reader according to claim 21, wherein the first part of the code element comprises conductive ink.

43. The code reader according to claim 42, wherein the ink is conductive on the frequency of the electromagnetic field generated by the reader.

44. The code reader according to claim 21, wherein the code comprises at least two bars having a same conductivity.

45. The code reader according to claim 21, wherein the code comprises a plurality of bars having conductivity values are substantially different from each other.

46. The code reader according to claim 21, wherein the code reader is in a mobile device.

47. The code reader according to claim 46, wherein the mobile device comprises at least one of the following: a mobile terminal, a communication device, an electronic notebook, a personal digital assistant.

* * * * *